United States Patent [19]

Filippov et al.

[11] Patent Number: 4,490,248

[45] Date of Patent: Dec. 25, 1984

[54] METHOD AND FLOTATION MACHINE FOR CONCENTRATING ORES OF NON-FERROUS METALS

[76] Inventors: Jury M. Filippov, ulitsa Derzhavina, 19, kv. 7; Gely R. Bochkarev, Krasny prospekt, 56, kv. 26, both of Novosibirsk, U.S.S.R.

[21] Appl. No.: 395,841

[22] Filed: Jul. 6, 1982

[51] Int. Cl.³ .......................... B03D 1/02; B03D 1/24
[52] U.S. Cl. .................................. 209/164; 209/170; 210/221.2; 210/703
[58] Field of Search ............... 209/164, 168, 170, 161, 209/159, 208, 169; 210/221.1, 703, 221.2, 519–527, 534, 536; 261/123

[56] References Cited

U.S. PATENT DOCUMENTS

| | | | |
|---|---|---|---|
| 2,350,943 | 6/1944 | Thompson et al. | 209/168 |
| 2,922,521 | 1/1960 | Schranz | 209/164 |
| 3,012,670 | 12/1961 | Ziemer | 209/170 |
| 3,032,199 | 5/1962 | Sumiya | 209/170 |
| 3,371,779 | 3/1968 | Hollingsworth et al. | 209/170 |
| 3,446,353 | 5/1969 | Davis | 209/164 |
| 4,255,262 | 3/1981 | O'Cheskey et al. | 209/170 |

FOREIGN PATENT DOCUMENTS

457493  1/1975  U.S.S.R. ........................... 209/169

*Primary Examiner*—Frank W. Lutter
*Assistant Examiner*—William Bond
*Attorney, Agent, or Firm*—Steinberg & Raskin

[57] ABSTRACT

A method for concentrating ores of non-ferrous metals by flotation, wherein a pulp and air mixture is prepared and fed through a nozzle under pressure to the bottom part of a mixing chamber. The mixture is directed toward an impact wall in such a manner that after the jet hits against the wall air bubbles of a diameter not exceeding 150–200 μm are formed. The flows resulting from the impact against this wall are directed toward each other in such a manner as to collide in the top part of the mixing chamber at a velocity maximum 90–100 cm/s and at an angle 40–75° with respect to the vertical axis of the mixing chamber, the resultant flow being deaerated, and a resultant froth layer removed. A flotation machine has a mixing chamber having a nozzle for feeding thereto a pulp and air mixture and an impact wall disposed directly adjacent to the nozzle, the mixing chamber having walls which are so shaped as to provide for carrying out the abovedescribed method.

12 Claims, 6 Drawing Figures

METHOD AND FLOTATION MACHINE FOR CONCENTRATING ORES OF NON-FERROUS METALS

BACKGROUND OF THE INVENTION

The invention relates to the concentration of ores of non-ferrous metals, and more particularly, to a method for concentrating ores of non-ferrous metals by flotation.

The invention may be most advantageously used in concentrating ores wherein the mineral being concentrated is in finely comminuted form and mineral particles are not completely separated from surrounding rock.

In addition, the invention may be effectively used in the flotation of coal, mineral chemical materials and also for the purification of the effluents.

Several types of flotation methods are used at present for the concentration of ores, and a certain type of ore requires a respective method of flotation.

However, in the majority of applications, none of the existing methods is capable of solving problems of flotation of minerals with a particle size smaller than 10 $\mu$m, and particles of ore with a small exposure of mineral grain. In certain constructions the problem of obtaining small-size air bubbles commensurable with the size of particles being flotated is solved, but conditions for effective flotation of minerals are not created.

In the majority of machines, the method of dispersion does not make it possible to obtain air bubbles required for the flotation of fine particles and ore particles with a small exposure of mineral.

Known in the art is a flotation machine (French patent No. 1483994) in which the main parts comprise a nozzle, a bath and a discharge pipeline. The nozzle is so constructed that an air jet is fed to the central zone of a jet, and pulp flows through guide members which impart thereto rotary motion in a circular path.

The nozzle directs the swirled concentric jet of a mixture of pulp and compressed air into a cell. The central air jet is entrained in rotation together with the surrounding pulp. It is the cooperation of pulp and air inside the nozzle that causes the separation of bubbles from the air "core" and ensures good stirring and contact of air bubbles with mineral particles.

The jet consisting of water and air travels through a distance which is sufficient for complete dispersion of air (the jet velocity thus decreases by several times) to flow around a baffle. The baffle absorbs the jet energy and gives rise to secondary flows around the primary mixing zone in the backward direction, i.e. to the nozzle orifice. Owing to the provision of the baffle, the pulp first ascends, then moves horizontally and finally descends into a deaeration zone where aggregates in the form of a bubble and a particle are separated from the pulp flow. The size of the deaeration zone is 4-6 times greater than the primary zone size.

The disadvantage of the above described flotation machine resides in that the use of a turbulent submerged jet for breaking down air bubbles is not efficient enough so that fine air bubbles which are needed for the flotation of fine particles of mineral are not obtained.

At the same time, the velocity of the jet in flowing around the barrier is not sufficient for obtaining small-size bubbles.

The rather high velocity of flow in flowing around the baffle hampers complete separation of bubbles. A bubble which gets into the zone behind the baffle is subjected to the action of strong currents moving toward the outlet pipeline.

Known in the art is a flotation apparatus (German patent No. 1067743) having a cylindrical agitation chamber in which the height of a pulp column is 1.5-3.5 times the width of the chamber, and a pump which feeds the pulp being floated together with air to the agitation chamber. An auxiliary cone is installed at the top adjacent to the agitation chamber, the cone having a discharge opening for removing a part of the pulp overflowing therein from the agitation chamber.

A serious disadvantage of the above described flotation machine resides in a non-uniform distribution of air bubbles over the cross-section of the jet flowing through the agitation chamber.

As the jet has the maximum velocity at the axis, it is along the jet axis that the maximum yield of the material and bubble-particle aggregates takes place, hence, there is no zone of steady flow in the top part of the pulp column. In addition, the dispersion of air bubbles in the submerged turbulent ascendent jet is rather inefficient, and there are no small-size bubbles so that the possibility of flotation of fine particles is low.

It is an object of the invention to provide a method and a flotation machine for concentration ores of non-ferrous metals which make it possible to float large-size particles as well as normal-size particles in an efficient manner.

Another object of the invention is to improve the capacity in concentrating ores of non-ferrous metals by flotation.

A further object of the invention is to reduce power requirements for flotation.

Still another object of the invention is to provide a simple, small-size and inexpensive flotation machine.

SUMMARY OF THE INVENTION

The invention substantially resides in the provision of a method for concentrating ores of non-ferrous metals by flotation, comprising preliminarily mixing a pulp with air for forming a pulp and air mixture which is then fed under pressure through a nozzle into the bottom part of a vertical mixing cell, said pulp and air mixture being directed toward an impact wall which is installed in said mixing chamber and disposed directly adjacent to said nozzle in such manner that when said jet hits against said wall, flows containing air bubbles of a diameter preferably not exceeding 150-200 $\mu$m are formed, whereafter the flows formed after the impact against said wall are directed toward one another in such a manner that they are caused to collide in the top part of said mixing chamber at a velocity maximum 90-100 cm/s at an angle of 40°-75° with respect to the vertical axis of said mixing chamber, with subsequent deaeration of the flow formed after the collision and removal of a resultant froth layer.

The method according to the invention enables an efficient flotation of ores of non-ferrous metals of various particle size, including particles of mineral of a size less than 10 $\mu$m, large-size particles as well as normal flotation size particles. This makes it possible to improve the extraction of valuable components.

When said pulp and air mixture is fed into said mixing chamber, it is preferably caused to pass through a dispersing chamber of a restricted capacity which is between 15 and 50% of the flow rate per second of said pulp and air mixture so as to lower the velocity of the inlet flow by 20–40%.

The passage of the pulp and air mixture through the dispersing chamber of a limited capacity makes it possible to obtain small-size bubbles so as to float particles of a size smaller than 10 μm and makes it possible to improve the yield of valuable components.

After said flow of pulp and air mixture leaves said dispersing chamber, it is preferably directed toward a guide wall which is inclined in the flow direction and is spaced from the point of emergence of the flow from said dispersing chamber at a distance such that the velocity of the flow hitting against said guide wall should be maximum 30–50% lower than the velocity of the flow leaving said dispersing chamber.

Directing the flow of the pulp and air mixture flowing from the dispersing chamber toward the additional impact wall makes it possible to obtain a large quantity of fine air bubbles with maximum diameter of 150 μm, the maximum size of large bubbles not exceeding 1.5–2.0 mm. A large quantity of fine bubbles makes it possible to float efficiently particles of a size smaller than 10 μm, particles of a size greater than 0.2 mm and particles of normal flotation size. All this makes it possible, in the end, to improve substantially the extraction of valuable components, while improving the throughput capacity and reducing energy consumption for flotation. At the same time, the simplicity of construction and a small size make a flotation machine inexpensive in the manufacture.

In the method for concentrating ores of non-ferrous metals by flotation a preliminarily prepared water and air mixture may be fed under pressure through a nozzle to the bottom part of a vertical mixing chamber and directed toward an impact wall which is disposed in said mixing chamber directly adjacent to said nozzle, the ratio of air to water in the water and air mixture and the velocity of the mixture being such that when the jet hits against the impact wall, flows containing air bubbles of a diameter maximum 150–200 μm are formed, and concurrently with that a preliminarily prepared pulp and air mixture is directed toward another impact wall which is disposed adjacent to the first impact wall, the air to pulp ratio in the pulp and air mixture and the velocity of its flow being such that when the jet hits against this impact wall, flows containing air bubbles of a diameter preferably not exceeding 2.5 mm are formed whereafter the resultant flows of the water and air mixture and the pulp and air mixture are mixed together and directed toward one another in such a manner that they are caused to collide in the top part of the mixing chamber at a velocity not exceeding 90–100 cm/s and at an angle between 40° and 75° with respect to the vertical axis of said mixing chamber, with subsequent deaeration of the flow formed after the collision and removal of a resultant froth layer.

Directing the water and air mixture toward the impact wall and directing the pulp and air mixture individually toward another impact wall makes it possible to obtain fine air bubbles which are capable of floating mineral particles of a size smaller than 10 μm.

At the same time, the separate feeding of the pulp and air and water and air mixtures makes it possible to prolong substantially the service life of the dispersing device and to reduce the energy consumption for flotation.

The water and air mixture admitted to the mixing chamber is preferably caused to pass through the dispersing chamber of a limited capacity which is between 15 and 30% of the flow rate per second and which offers a resistance to the flow such that the initial flow velocity is reduced by 20–40% at the outlet from said dispersing chamber, whereafter the flow of the water and air mixture is directed toward the additional guide wall which is inclined in the flow direction and which is spaced from the outlet of the flow from the dispersing chamber at a distance such that the velocity of the flow hitting against the additional wall should be maximum 30–50% lower than the velocity of the flow leaving said dispersing chamber, whereafter said flow of the water and air mixture is mixed with the flow of the pulp and air mixture.

A greater quantity of small-size air bubbles with a maximum diameter of 150 μm are formed in the flow of the water and air mixture directed toward the additional flat wall after the dispersing chamber. The intensive stirring of the two flows upon their collision contributes to a more complete extraction of valuable components, to an improvement in the throughput capacity and to a more efficient flotation of particles smaller than 10 μm.

The above described flotation method is preferably carried out in a flotation machine for concentrating ores of non-ferrous metals, comprising a vertical mixing chamber having a bottom part and a top part, a nozzle installed in the bottom part of the mixing chamber for feeding thereto a pulp and air mixture under pressure;

an impact wall disposed directly adjacent to said nozzle at a distance of maximum eight times the diameter of said nozzle in such a manner that the admitted pulp and air mixture should hit thereagainst with the formation of air bubbles of a diameter which is preferably maximum 150–200 μm in the flows resulting from such impact;

walls of said mixing chamber being adapted to direct the flows resulting from the impact wall toward the top part of said mixing chamber and toward one another, said top part being of an upwardly narrowing configuration with such an angle of inclination of the side walls that the flows collide at an angle of 40°–75° with respect to the vertical axis of said mixing chamber;

a pulp lift chamber which has its walls narrowing downwardly and which has its narrower part communicating with said top part of the mixing chamber;

a pulp deaeration chamber which is adjacent to said pulp lift chamber and which is in a fluid communication relationship therewith in such a manner that the pulp could overflow through the edge of said pulp lift chamber to said deaeration chamber;

means for removing a froth layer of the pulp formed in said deaeration chamber;

means for discharging a residual product from said deaeration chamber.

The construction of the flotation machine according to the invention makes it possible to carry out the method for concentration ores of non-ferrous metals according to the invention and to provide a flotation machine which is simple in structure and efficient in operation.

This construction makes it possible to provide flotation machines of practically any desired capacity which enable ores of non-ferrous metals to be concentrated over a wide range of size of non-ferrous metal particles contained therein. The flotation machine according to the invention is especially efficient for the flotation of fine particles with a size smaller than 10 μm.

The flotation machine is preferably provided with a dispersing chamber of a limited capacity for the passage therethrough of the flow of pulp, the dispersing chamber being provided inside said mixing chamber above said nozzle in such a manner that its wall disposed opposite to the outlet orifice of said nozzle is said impact wall, said dispersing chamber being of a capacity which is between 15 and 50% of the flow rate per second incoming through said nozzle and being designed for reducing the velocity of flow which is caused to pass therethrough by 30-70%.

The provision in the mixing chamber of the chamber for dispersing the pulp and air mixture makes it possible to obtain small-size air bubbles which contribute to the flotation of particles of a size smaller than 10 $\mu$m.

It is preferred to provide in the flotation machine, on the path of the flow leaving said dispersing chamber, a guide wall inclined in the flow direction at a distance from said dispersing chamber such that the velocity of the flow hitting against said guide wall should be maximum 30-50% lower than the velocity of the flow leaving said dispersing chamber.

The provision of the inclined wall in the bottom part of the mixing chamber contributes to a more intensive stirring of the flow so as to improve the throughput capacity and extraction of valuable components.

The flotation machine is preferably provided with an auxiliary nozzle for feeding to said mixing chamber a preliminarily prepared pulp and air mixture, the nozzle being disposed opposite to said nozzle in the bottom part of said mixing chamber on the other side of said impact wall and at a distance therefrom such that the pulp and air mixture being fed hits thereagainst with the formation therein of air bubbles of a diameter which substantially does not exceed 2.5 mm, a preliminarily prepared water and air mixture being fed through said nozzle in the bottom part of the mixing chamber, and said guide wall being positioned in such a manner with respect to said dispersing chamber that when the flow of water and air mixture is reflected therefrom this flow is mixed with the flow of the pulp and air mixture.

The provision in the flotation machine of the nozzle for feeding the pulp and air mixture and the dispersing chamber through which the water and air mixture is caused to pass makes it possible to obtain small-size air bubbles; this facility makes it possible to float in an efficient manner mineral particles of a size smaller than 10 $\mu$m, to improve the extraction of valuable components and the throughput capacity of the machine; in addition, the comsumption of electric energy required for the flotation is reduced and the service life of the dispersing chamber is prolonged.

It is preferred to provide in the flotation machine, in the top part of said pulp lift chamber, a conical flow splitter which is installed in such a manner that its pointed portion faces down and the upper portion protrudes over the upper edge of said pulp lift chamber and is in the zone of the froth layer so as to split the pulp flow admitted to said pulp lift chamber into several flows, and said deaeration chamber is preferably divided into compartments, each compartment receiving an individual flow of pulp.

The conical flow splitter provided in the pulp lift chamber makes it possible to divide the flow of ascending pulp into several flows, the release of bubble-particles aggregates occurring over the entire froth area so as to improve the extraction of valuable components and the throughput capacity.

It is preferred to provide each said compartment of the deaeration chamber of the flotation machine with means for controlling the pulp level.

Means for controlling the pulp level is provided in the flotation machine for efficiently maintaining a desired pulp level so as to improve the extraction yield and to facilitate operation.

DETAILED DESCRIPTION OF PREFERRED EMBODIMENTS

Specific terminology is used in the description of the specific embodiment of the invention given below. It is, however, to be understood that the embodiment described below and the terms used do not restrict the spirit and scope of the invention in any way.

Figure 1:
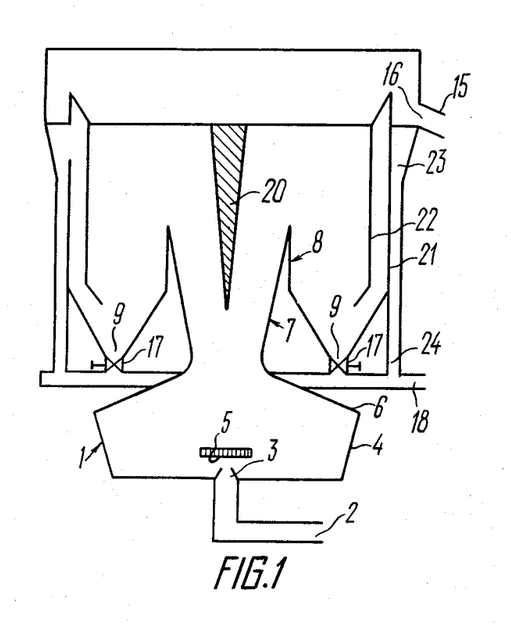
FIG. 1 schematically shows a flotation machine for concentrating ores of non-ferrous metals according to the invention.
Figure 2:
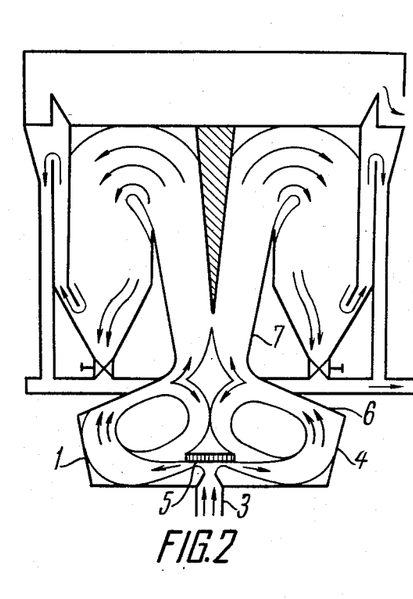
FIG. 2 is a schematic view of the flow patterns obtained in the flotation machine of FIG. 1.

Air at a pressure at least equal to that in a pipeline 2 is fed into a flow of a pulp supplied through a pipeline to a mixing chamber 1 (FIG. 1). The quantity of air depends on the amount of the material being floated and should be within the range of 20 to 70% of the volume of the pulp being fed. With the flow velocity in the pipeline at least 2 m/s, the air is mixed with the pulp, and the air bubbles are broken down, the size of the bubbles depending on the time of pulp and air contact, velocity of flow and quantity of the air. Maximum size of the bubbles is between 4 and 5 mm.

Therefore, the preliminarily prepared pulp and air mixture is admitted under pressure through a nozzle 3 to a bottom part 4 of the mixing chamber 1 at an initial velocity of at least 18 m/s. An impact wall 5 is installed directly adjacent to the nozzle 3, and the flow of the pulp and air mixture hits against this wall. When the jet hits against the impact wall 5 at a high velocity, an intensive breaking down of air bubbles occur, and a large quantity of fine bubbles are formed in the jet, with a maximum diameter of the bubbles being within the range of 150-200 $\mu$m. The large quantity of the air bubbles of a diameter smaller than 150 $\mu$m contribute to an efficient flotation of fine particles with a diameter smaller than 10 $\mu$m and of normal flotation size particles.

This is explained by the fact that the dimensions of particles and bubbles are too small compared with the internal scale of turbulence and there is complete entrainment of particles and bubbles with turbulent fluctuations of a size which takes the critical part in the mechanism governing the coupling of suspended particles and bubbles.

The particles and bubbles entrained by turbulent fluctuations move chaotically within the liquid volume. The presence of a gradient of concentration in the chaotically agitated liquid, which is caused by the process of conglomeration of the particles and bubbles, results in the establishment of a systematic transfer of the substance in the direction toward the concentration decrease.

After the jet has hit against the impact wall 5, the flow moves along the bottom of the mixing chamber 1 and, upon reaching its side walls, the resultant flows move upwardly along the walls, two zones being well distinct in the flow structure: a zone of the linear flow in the form of a spreading jet and a swirling circulation zone (as shown by arrows in FIG. 1). The friction between the boundary jet layer and the swirl, which is due to a strong stirring occurring at this point in the presence of large gradients of a velocity component directed along the flow axis, will dampen a substantial part of the energy of the spreading jet.

In a top part 6 of the mixing chamber 1, the flows moving at equal velocities of maximum 90–100 cm/s and at an angle $\alpha=40°-75°$ with respect to the axis of the resultant flow (or to the vertical axis of the mixing chamber 1) collide and move upwardly.

In the zone of collision of two turbulent flows which represent semirestricted jets, the momentum of liquid has a transverse component which is rather big in value, which gives rise to an intensive stirring and, as a consequence, to an increased number of collisions between mineral particles and air bubbles.

The area of collision of the two flows at a certain angle is characterized by substantial vibrations. The flows themselves form the vibration zone when colliding, but this zone features a directive flow of liquid.

The situation is still more interesting when the velocity of the flows and the angle of collision are increased. Two distinctly defined ellipsoidal swirls are formed in the zone of collision, which rotate at a high speed, characterized by a large gradient of velocity with strongly pronounced fluctuations. It is obvious that in this case, the process of conglomeration of small particles with large bubbles will occur very efficiently.

The provision of such favourable conditions for conglomeration of mineral particles with air bubbles makes it possible to intensify the conglomeration process which, in the end, enables an improvement of the extraction of mineral during flotation.

The bubble-particles aggregates move together with the pulp flow to a pulp lift chamber 7 and then to a deaeration chamber 8 wherein they are released into a froth layer, and that part of the pulp which failed to float (residual product) moves to the bottom part of the deaeration chamber 8 where it leaves through an opening 9 to the discharge.

The velocity of the pulp flow moving through the deaeration chamber along the froth layer does not exceed 8–10 cm/s.

Figure 3:
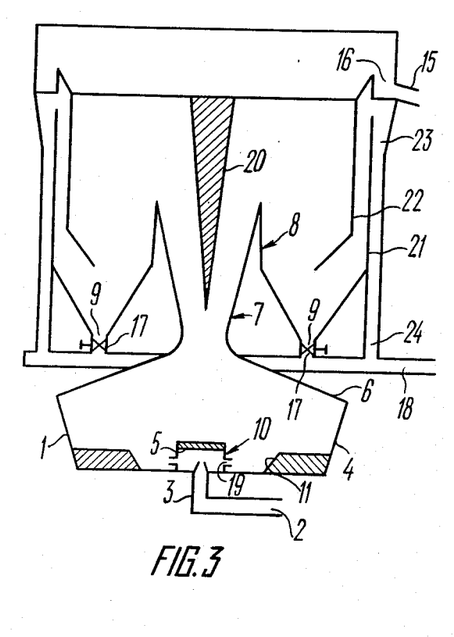
FIGS. 3 and 4 are schematic views of a second embodiment and its flow patterns having a dispersing chamber and auxiliary guide walls.
Figure 4:
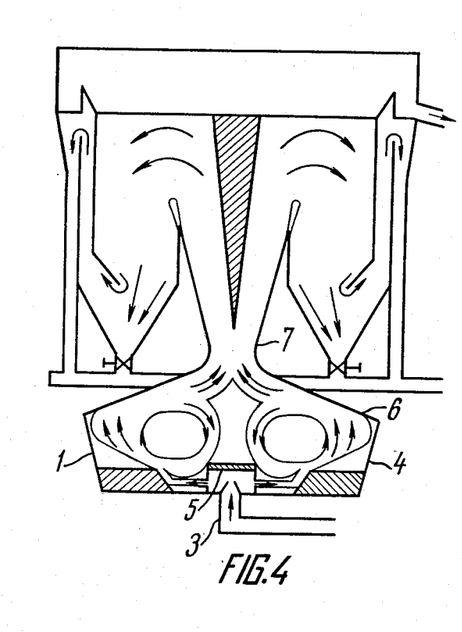

In one embodiment of the invention as shown in FIGS. 3 and 4, the preliminarily prepared pulp and air mixture is fed under pressure through the nozzle 3 to a dispersing chamber 10 of a limited capacity which is disposed inside the mixing chamber. The volume of the dispersing chamber 10 is within 15–50% of the flow rate per second of the pulp and air mixture. The jet of the pulp and air mixture at the outlet of the nozzle 3 hits against the impact wall 5 which may be in the form of one of the walls of the chamber 10 and which is disposed directly adjacent to the nozzle 3. The pulp flow then leaves the chamber 10. The flow velocity is thus 30–70% lower than the velocity of the flow leaving the nozzle 3. The use of the dispersing chamber 10 of a limited capacity makes it possible to effect the breaking of air bubbles in a more efficient manner so that the quantity of fine bubbles in the flow of pulp and air mixture leaving the chamber 10 substantially increases, the size of large bubbles being reduced.

The character of the flow movements is described below and illustrated in FIG. 4.

The preliminarily prepared pulp and air mixture leaving the nozzle 3 enters the dispersing chamber 10 of a limited capacity, and upon leaving the chamber 10, the velocity of the flow decreases by 30–70% of the jet velocity at the outlet of the nozzle 3.

The use of the dispersing chamber 10 of a limited capacity makes it possible to effect breaking of air bubbles in a more intensive manner so that the quantity of fine air bubbles in the flow of the pulp and air mixture leaving the chamber 10 substantially increases, the size of large bubbles becoming still smaller.

After the flow of the pulp and air mixture leaves the chamber 10, it is directed to an auxiliary flat guide wall 11 which is installed at a certain angle with respect to the flow direction and is spaced from the point of emergence of the flow from the dispersing chamber 10 at a distance such that the velocity of the flow hitting against the auxiliary guide wall 11 should be maximum 30–50% lower than the velocity of the flow leaving the dispersing chamber 10.

When the flow moves around the wall 11 at a high velocity, additional breaking of air bubbles occur in the pulp flow, the quantity of fine bubbles increases, and the size of "large" bubbles of 1.5–2.0 mm substantially decreases. The resultant spectrum of the air bubbles featuring a large quantity of fine bubbles with a maximum size of 150 μm and large bubbles of a diameter between 1.5 and 20 mm makes it possible to float in an efficient manner both mineral particles of a size smaller than 10 μm and normal flotation size particles.

When the flow of the pulp and air mixture flows around the flat wall 11, it moves upwardly, and three zones are distinctly defined in the flow structure: a zone of a linear flow in the form of a spreading jet, a circulation zone in the form of a swirl, and a second swirl which is disposed in the area between the chamber wall and the jet boundary. The friction between the jet layer and the swirls, which is due to a strong stirring developing in this zone in the presence of large gradients of the longitudinal component of velocity, will dampen a substantial part of energy of the spreading jet. The presence of the zones with a strongly pronounced swirl contributes to a more efficient process of stirring of air bubbles and pulp.

Figure 5:
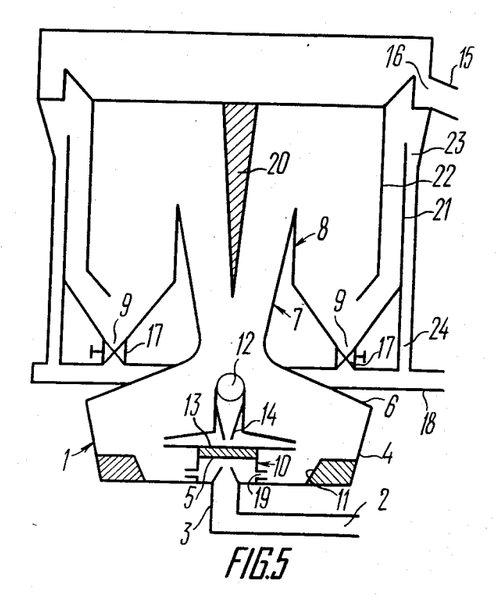
FIGS. 5 and 6 display the flotation machine of FIGS. 3 and 4 further having an auxiliary nozzle.

In another embodiment of the invention shown in FIG. 5 air, under a pressure at least equal to the pressure in the pipeline 2 is fed into the flow of water pumped along the pipeline 2. The amount of air should be within 50–80% of the amount of water. During the movement along the pipeline 2 at a velocity at least 3–4 m/s air bubbles are broken, the bubble size depending on the time of contact of air with water, velocity of flow and quantity of air. The water and air mixture which is thus prepared is fed under pressure through a nozzle 3 to the bottom part 4 of the vertical mixing chamber 1 and is fed to the flat wall 5 disposed directly adjacent to the nozzle 3 so as to ensure the velocity of flow of the mixture such that when the jet hits against the wall 5, flows are formed containing air bubbles of a maximum diameter preferably not exceeding 150–200 μm.

Air at a low pressure (at least 0.8 atm.) is fed into the flow of pulp pumped through the pipeline 12. The amount of air depends on the amount of the material being floated and should be within 15–40% of the amount of the pulp.

The preliminarily prepared pulp and air mixture is directed at a velocity at 4–8 m/s toward another flat wall 13 which is disposed adjacent to the first wall 5. When the jet hits against the wall 13, flows are formed containing air bubbles of a diameter preferably maximum 2.5 mm. Therefore, with a separate supply of the pulp and air mixture and water and air mixture, a spectrum of bubbles is obtained: small-size bubbles of a maximum diameter 150–200 $\mu$m and large-size bubbles of a diameter 2.0–2.5 mm.

In addition, the energy requirements are substantially reduced as a pump feeding the pulp to the flotation machine functions at a lower pressure. The service life of a nozzle 14 through which the pulp and air mixture is fed is thus prolonged.

Figure 6:
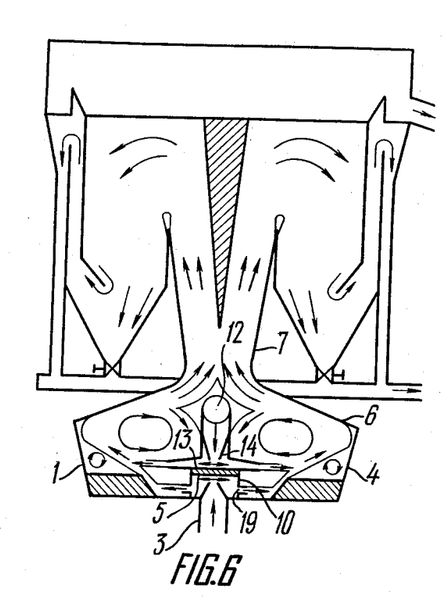

As illustrated in FIG. 6 the flows of the water and air mixture and pulp and air mixture are mixed together and fed toward one another so as to collide in the top part 6 of the mixing chamber at a velocity maximum 90–100 cm/s at an angle $\alpha = 40°–75°$ with respect to the axis of the flow resulting from the collision which is subsequently fed to the pulp lift chamber 7 and then to the deaeration chamber 8. Bubble and particle aggregates are released to a froth layer, and the residual product is removed through discharge openings 9 in the bottom part of the dearation chamber 8.

The jet of the preliminarily prepared water and air mixture is admitted to the dispersing chamber 10 of a limited capacity which is 15–30% of the flow rate per second and hits against the flat wall 5 disposed directly adjacent to the nozzle 3. The dispersing chamber 10 offers a greater resistance to the flow, the major part of energy spent to overcome this resistance being consumed for breaking-down air bubbles.

Upon leaving the dispersing chamber, the flow, which is at a velocity which is 20–40% lower than the velocity of the jet, hits against an auxiliary flat wall 11 inclined in the flow direction. The wall 11 is spaced from the dispersing chamber 10 at a distance such that when the flow hits against the wall 11 its velocity should be maximum 30–50% lower than the velocity of the flow a emerging from the dispersing chamber. Subsequently the flow of the water and air mixture is mixed with the flow of the pulp and air mixture, and further the movement of the flows in the flotation machine is similar to that described above.

Therefore, by using the dispersing chamber 10 of a limited capacity and the auxiliary flat wall, a larger quantity of small-size bubbles may be obtained with a maximum diameter 150 $\mu$m. When air bubbles are broken down in the flow of pulp, air bubbles of a diameter between 2.0 and 2.5 mm are obtained.

Therefore, in using the dispersing chamber 10 and the flat wall 11 against which the flow of the water and air mixture hits, the same quantity of small-size bubbles is obtained as in the case where the pulp and air mixture is caused to pass through the dispersing chamber.

The flotation machine, as illustrated in the preferred embodiments, for concentrating ores of non-ferrous metals comprises a vertical mixing chamber 1 which may be of circular, square or polygonal configuration. The base of the chamber 1 is made of a plate steel and should be lined with an abrasion resistant material. The side walls of the mixing chamber 1 are slightly inclined at 10°–30° with respect to the vertical axis and are made of a conventional plate steel. The height of the side walls of the chamber is 30–50% of the length thereof. The top part 6 of the chamber 1 narrows to the top, e.g., in the form of a truncated cone with an angle of inclination of the side walls enabling the flows to collide at an angle of 40°–75° with respect to the vertical axis of the chamber 1. The selection of the angle of inclination is very important as the amount of the pulp and air mixture fed for the formation of the ascendent jet and the amount of the same mixture fed to the chamber for the formation of the circulation zone depend on the value of this angle. Thus with the angle value between 65° and 70°, 70% of the whole mass go for the formation of the upwardly moving jet and 30% of the mass of the flow are directed to the chamber 1. The width of the mixing chamber 1, or its diameter, depends on the total throughput capacity of the flotation machine and may be within the range from 0.4 to 1.5 m. In case the width exceeds 0.7–0.9 m, guide plates should be provided which at the same time function as ridges. The capacity of the mixing chamber 1 should be equal to the volume of the pulp fed for flotation during a time between 12 and 20 seconds. Therefore, the dimensions of the mixing chamber 1 of the flotation machine according to the invention are quite definite and may be calculated for practically any desired throughput capacity.

The nozzle 3 for feeding the pulp and air mixture to the chamber 1 is installed in the bottom part of the mixing chamber 1, at the center of the base thereof. The nozzle 3 is of a frustoconical shape and is made of an abrasion resistant material. The dimensions of the nozzle 3 depend on the volume of the pulp fed to the flotation machine, the diameter of the upper orifice being such that the velocity of flow leaving the nozzle should be at least 18 m/s. The angle of cone is 30°. With a greater throughput capacity, the mixing chamber 1 may have two-three nozzles aligned along a line dividing the chamber base in half.

The impact wall 5 is disposed directly adjacent to the nozzle 3 at a distance of maximum eight times the diameter of the nozzle 3. A greater distance results in a material decrease in the jet velocity thus substantially lowering the efficiency of air bubble breaking. The length of the wall 5 should be equal to $\frac{1}{3}$ of the chamber length. The wall 5 is made of steel and has a lining of an abrasion resistant material.

The flotation machine, as illustrated in the preferred embodiments, comprises the pulp lift chamber 7 which is made in the form of a truncated cone having its narrower part communicating with the top part of the mixing chamber 1. The cross-sectional configuration of the pulp lift chamber 7 should be identical to that of the mixing chamber. The dimensions of the narrower part should be such that the velocity of the jet formed after the collision of the flows should be within 90–100 cm/s and the angle of cone should be within 20°–30°.

The height of the pulp lift chamber 7 depends on the cross-sectional size of the narrower part and should be 3–4 times as much as this size. The height of the chamber 7 and the angle of cone are chosen in such a manner that the jet resulting from the collision should ascend to fill up the entire cross-sectional area of the chamber 7 in the uniform manner. The chamber 7 is made of plate steel. In case the throughput capacity of the flotation machine is large and the width of the pulp lift chamber 7 is greater than 0.7–0.9 m, guide plates should be installed to split the flow into two parts.

The capacity of the pulp lift chamber 7 is equal to the volume of the pulp admitted to the flotation machine during 1.5-2 seconds.

The flotation machine, as illustrated in the preferred embodiments, comprises the pulp deaeration chamber 8 which is adjacent to the pulp lift chamber and is in the fluid communication relationship therewith in such a manner that the pulp moving up overflows over the edge of the pulp lift chamber 7 to the deaeration chamber 8.

Depending on the configuration of the flotation machine, the cross-sectional configuration of the deaeration chamber 8 may be rectangular or annular with the frustoconical bottom part. In case of the annular configuration of the deaeration chamber 8, the chamber is generally divided into six compartments by plates which are also used as ridges. The top edge of the plate extends to the froth layer only.

In such form, the deaeration chamber 8 is characteristic in all its aspects of the column-type flotation machine. The cross-sectional area of the deaeration chamber 8 is calculated in such a manner that the velocity of flow carrying non-floating particles moving to the bottom part of the chamber 8 should not exceed 4-6 m/s. The height of the chamber 8 depends on the volume of the pulp admitted to the flotation machine and is equal to the sum of the height of the pulp lift chamber 7 and the height of the flow leaving the chamber 7. Therefore the bottom part of the deaeration chamber 8 extends to the upper wall of the mixing chamber 1. This large height of the deaeration chamber 8 is dictated by the need to create a zone of flows with low velocities adjacent the froth layer so that during flotation, particles of minerals of a large size exceeding 0.2-0.3 mm precipitate from the flow moving along the froth layer to the bottom part of the deaeration chamber 8. When the flow descends to the bottom part of the chamber 8, the flow velocity increases. At the same time, a greater height of the chamber 8 is also aimed at another object: those particles which did not adhere to bubbles in the deaeration chamber 8 will adhere to bubbles and will be entrained in the froth layer. Therefore, the capacity of the deaeration chamber 8 is rather large and is equal to the volume of the pulp which is admitted to the flotation machine during 24-30 seconds.

The flotation machine, as illustrated in the preferred embodiments, has means for removing the froth layer. In this flotation machine, the froth is removed by conventional froth removers and may be discharged into a trough 15 for collecting froth product under gravity. The trough 15 is inclined toward a discharge opening 16. In case the flotation machine is of the circular configuration, the froth product overflows under gravity into a trough which is of the annular configuration. In case the flotation machine is 1.2-1.5 m wide, the froth product is discharged on either side so as to reduced substantially the degree of disruption of the froth layer and to improve the extraction of valuable components. The flotation machine comprises means for discharging the residual product from the deaeration chamber. A device for discharging the chamber product is disposed in the bottom part of the deaeration chamber and comprises a pipe 17 with controllable cross-sectional area which is connected to a pipeline 18 for the discharge of the chamber (residual) product. In case of a circular flotation machine, each compartment has its own discharge device, and the entire chamber product is fed to a circular pipeline.

The flotation machine, as illustrated in the preferred embodiments of FIGS. 3 and 5, has the dispersing chamber 10 of a limited capacity. The chamber 10 is installed inside the mixing chamber in the bottom part 4 thereof over the nozzle 3 for the discharge of the pulp and air mixture. The upper wall of the chamber is disposed directly adjacent to the nozzle 3 and is the impact wall 5. The wall 5 is made of an abrasion resistant material. The dispersing chamber 10 may be in the form of a cylinder in a circular flotation machine or rectangular for a rectangular flotation machine. The chamber has discharge openings or slits 19 maximum 1.5-2.0 cm long facing toward the side walls of the flotation machine. The slits 19 have, externally of the chamber 10, guide plates which are necessary for forming the flow leaving the chamber 10. The discharge slits 19 are spaced along the circle in case the cylindrical dispersing chamber 10 is used. The total area of the discharge slits 19 should be such that the velocity of flow leaving the dispersing chamber should be 30-70% lower than the velocity of the jet leaving the nozzle 3. The total capacity of the chamber 10 is 15-50% of the volume of pulp admitted to the flotation machine during one second. The chamber 10 should be made entirely of an abrasion resistant material.

Large-capacity flotation machines may have 2-4 chambers aligned along a line extending through the center of the mixing chamber base. One dispersing chamber 10 is provided for a circular flotation machine with 2-4 nozzles 3 depending on the throughput capacity.

The flotation machine, as illustrated in the preferred embodiments of FIGS. 3 and 5, has the guide wall 11 in the bottom part 4 of the mixing chamber 1, the guide wall 11 being disposed on the path of the flow leaving the dispersing chamber 10. The wall 11 is inclined in the direction of flow and extends at an angle from 95° to 135° with respect to the flow direction. The wall extends over the whole width of the mixing chamber 1 in case of the rectangular base and over the length of circle in case the mixing chamber 1 has a round base. The wall height should be at least 5 times as great as the flow height. The wall 11 should be spaced from the dispersing chamber 10 at a distance such that the flow leaving the chamber 10 should have the velocity which is 30-50% lower than the velocity of the flow leaving the chamber 10. The wall 11 should be made of a material which is resistant to abrasion or it should be lined with an abrasion resistant material.

The flotation machine illustrated in FIG. 5 has the auxiliary nozzle 14 for feeding to the mixing chamber 1 the preliminarily prepared pulp and air mixture. The nozzle 14 is installed at the center of the base of the mixing chamber 1 directly adjacent to the impact wall 13 which may be formed, e.g., by the back side of the impact wall 5 which is opposite to the nozzle 3. The nozzle 14 is of a frustoconical shape and is fixed directly to the pipeline 12 admitting the pulp and air mixture, the dimensions of the nozzle 14 depending on the volume of the pulp fed to the flotation machine, the diameter of the smaller orifice being such that the velocity of the jet leaving the nozzle 3 should be at least 5-6 m/s. The angle of cone is 30°. The diameter of air bubbles formed upon collision of the jet with the wall should not exceed 2.5 mm. In case the volume of the pulp fed for flotation is large, 2-4 nozzles for admitting the pulp and air mixture should be provided, and all the nozzles are installed in front of the dispersing chamber. The length of the impact wall 13 is greater than the length of the impact wall 5 of the dispersing chamber 10 and is equal to the distance which 80% of the distance from the guide walls 11. In case of the round base of the mixing chamber the impact wall 13 is also circular.

The prepared water and air mixture is fed to the dispersing chamber 10 installed in the bottom part 4 of the mixing chamber 1, the capacity of the dispersing chamber being smaller than that of the chamber for the pulp and air mixture and is 15-30% of the volume of the water and air mixture fed per second. The nozzle 3 is of a frustoconical shape, the area of the outlet cross-section being calculated in such a manner that the velocity of the water and air mixture at the outlet of the cone should be at least 25 m/s. The volume of water fed to the flotation machine for obtaining small-size bubbles does not exceed 25% of the volume of pulp fed for flotation. The chamber 10 for dispersing the water and air mixture has outlet slots 19 facing toward the side walls of the mixing chamber 1, the total area of the slits being such that the velocity of flow leaving the chamber 10 being 20-40% lower than the velocity of the jet leaving the nozzle 3. The dispersing chamber 10 and the nozzle 3 are made of a conventional steel. The service life of these parts should be more than 3-4 thousand hours, and if the walls of the chamber 10 and nozzles 3 are lined with an abrasion resistant material their service life can be prolonged to several years.

The use of the dispersing chamber 10 for dispersing the water and air mixture for obtaining small-size air bubbles (maximum diameter 150 $\mu$m) makes it possible to prolong substantially the service life of the wall and nozzle feeding the pulp and air mixture, the energy requirements for the pump feeding the pulp being reduced by 3-4 times. At the same time, the power consumption of a pump for feeding water is insignificant.

The guide wall 11 is spaced from the dispersing chamber 10 at a distance such that the change in the velocity upon the collision of the flow with the wall should not exceed 30-50% of less than the initial velocity of the flow coming from the dispersing chamber 10. The wall is inclined in the direction of flow and is at an angle of 110°-140° with respect to the flow direction, and the wall height does not exceed the height of the dispersing chamber 10. This angle of inclination of the wall 11 makes it possible to stir in an intensive manner the flow of the water and air mixture which ascends and collides with the flow of the pulp and air mixture at an angle of 20°-50°.

The flotation machine, as illustrated in the preferred embodiments, has in the top part of the pulp lift chamber a conical flow splitter 20 which is installed with its pointed portion facing downward and the upper portion protruding over the upper edge of the pulp lift chamber 7 and extending in the zone of the froth layer.

The flow splitter 20 is cuneiform for a rectangular flotation machine with the width equal to the lift chamber width, and in the form of a cone for a circular flotation machine. The angle of cone of the flow splitter is between 5° and 10°.

The employment of the flow splitter 20 contributes to a more directive ascendent movement of the flows; instead of a turbulent jet having the maximum velocity at its axis, and wherein the major part of bubble-particle aggregates are concentrated, there are two equal flows which are completely isolated from each other, and the distribution of velocities in the flow cross-section is more uniform than in a single jet. In case of a circular flotation machine, the flow splitter 20 divides the jet into six equal flows which are admitted to the deaeration chamber also divided into six isolated compartments. Therefore, the velocities of flows in each part are identical.

In addition, the employment of the flow splitter 20 makes it possible to distribute the surfacing particle-bubble aggregates uniformly over the whole surface of the froth layer thus reducing the destruction of the resultant froth layer and improving the extraction of valuable components.

The flow splitter 20 is made of plate steel.

The flotation machine of the preferred embodiments has in each compartment of the deaeration chamber 8 means for controlling the pulp level. A side wall 21 of the deaeration chamber 8 is separated from the interior of the chamber by a guide plate 22 of a width equal to the width of the deaeration chamber 8 and of a height which is 70% of the height of the whole chamber 8, the upper portion of the guide plate extending over the froth layer.

In case of a circular flotation machine, the upper portion of the plate 22 is aligned with the lower boundary of the froth layer. The height of the side wall 21 of the deaeration chamber 8 is below the pulp level by 15-20 cm and has vertically adjustable plates in the upper part. Thus, the flow of non-floating pulp moves within a confined space upwardly between the side wall 21 of the chambers 8 and the guide plate 22. The distance between the side wall 21 and the guide plate 22 is chosen in such a manner that the flow velocity should be 15-20 cm/s.

The pulp flow ascends to overflow over the edge and to enter into a chamber 23 which is conical in shape and has its lower part terminating in a pipe for discharging the pulp to a pipeline 18. As the area of the flow freely overflowing a spillway or edge is large, and the height of the flow is several cm only, the efficiency of operation of the means for maintaining the pulp level is obvious. Upon an increase in the load on the flotation machine by as much as 50%, the height of the flow overflowing over the edge will increase only by 1.0-1.5 cm so that the level of pulp in the flotation machine will increase by 1.0-1.5 cm. The adjustable plates make it possible to control the pulp level thereby determining the height of the froth layer.

The lower part of the deaeration chamber 8 is in the form of an inverted truncated pyramid with the angle of inclination of sides 30°, and the pipe 17 is connected to the bottom part thereof and has the other end connected to the pipeline 18 for removing the chamber products. The discharge pipe 17 is of a controllable cross-sectional area, the area being calculated in such a manner as to let through the volume of pulp equal to 8-12% of the total volume of pulp fed to the flotation machine per second. For a circular flotation machine there will be six such controllable openings to equal the number of the compartments of the deaeration chamber, and the area of each opening should be chosen in such a manner as to let through the volume of pulp equal to 4-6% of the total volume fed per second. Therefore, large-size particles of material precipitating from the flow are deposited in the bottom part of the deaeration chamber 8 and get to the pipeline 18 through the controllable opening 9.

It will be apparent that the invention provides a single-cell pneumatic flotation machine for floating particles of a size smaller than 10 $\mu$m, aggregates with a small degree of exposure, particles with a diameter larger than 0.2 mm and normal flotation size particles.

Equations describing the flotation process occurring in this machine have been derived from the general mathematical model of the flotation process. Experimental results obtained during investigations made it possible to obtain certain relationships of basic flotation parameters versus flow characteristics.

We can state that the mathematical model of the flotation process that we have obtained makes it possible to provide a flotation machine of practically any desired capacity. Flotation machines with a capacity from 50 kg/h to 70-80 kg/h of solid have been made, and tests conducted with these machines confirmed the correctness of the model.

We can state that the mathematical model of the flotation process makes it possible to calculate the parameters and provide a flotation machine practically for any desired material.

We claim:

1. A method for concentrating ores of non-ferrous metals by flotation, comprising the steps of
   mixing a pulp with air for forming a pulp and air mixture,
   feeding said mixture under pressure through a nozzle to the bottom part of a vertical mixing chamber,
   directing said pulp and air mixture toward an impact wall provided in said mixing chamber and disposed directly adjacent to said nozzle to form a plurality of pulp and air flows containing individual air bubbles of a diameter not exceeding 150-200 μm when said pulp and air mixtures hits said wall,
   directing the flows resulting from the impact against said wall toward one another to cause collision of said respective flows in a top part of said mixing chamber at a velocity of 90-100 cm/s and at an angle of 40°-75° with respect to a vertical axis of said mixing chamber, and
   subsequently deaerating a flow formed as a result of the collision and removing a resultant froth layer.

2. A method according to claim 1, wherein, when said pulp and air mixture is fed to said mixing chamber, said pulp and air mixture is passed through a dispersing chamber of a limited capacity which is 15-50% of the flow rate per second of said pulp and air mixture, to lower the velocity of the pulp and air mixture flow by 20-40%.

3. A method according to claim 2, wherein after said flow of the pulp and air mixture exits from said dispersing chamber through outlet opening means, said pulp and air mixture is directed toward a guide wall which is inclined in a direction of flow and spaced from a point of discharge of flow from said dispersing chamber at a distance to lower the velocity of the flow hitting against said guide wall to 30-50% the velocity of the flow exiting from said dispersing chamber.

4. A method for concentrating ores of non-ferrous metals by flotation, comprising the steps of
   preliminarily preparing a water and air mixture,
   feeding said mixture under pressure through a nozzle to a bottom part of a vertical mixing chamber,
   directing said mixture toward an impact wall installed in said mixing chamber and disposed directly adjacent to said nozzle to form a plurality of flows of the water and air mixture which contain individual air bubbles having a diameter not exceeding 150-200 μm when said water and air mixture hits said wall,
   simultaneously directing a preliminarily prepared pulp and air mixture toward a second impact wall disposed adjacent to said first impact wall to form a plurality of pulp and air flows which contain individual air bubbles of a diameter maximum 2.5 mm,
   mixing the resultant flows of the water and air mixture and pulp and air mixture by directing the respective flows toward one another to cause collision of said respective flows in the top part of said mixing chamber at a velocity not exceeding 90-100 cm/s and at an angle of 40°-75° with respect to a vertical axis of said mixing chamber,
   subsequently deaerating the resultant flow formed after the collision and removing a resultant froth layer.

5. A method according to claim 4, wherein said air and water mixture is initially passed through a dispersing chamber having outlet opening means, and of a lmited capacity which is 15-30% of the flow rate per second of said water and air mixture, to lower the velocity of the flow by 20-40% at the outlet of said dispersing chamber, and
   after said flow of water and air mixture exits from said dispersing chamber through said outlet opening means, said flow is directed toward an auxiliary guide wall which is inclined in a direction of flow and is spaced from the outlet of the flow from said dispersing chamber at a distance to lower the velocity of the flow hitting against said auxiliary guide wall 11 to 30-50% the velocity of the flow exiting from said dispersing chamber, before said flow of water and air mixture is mixed with said flow of pulp and air mixture.

6. A flotation machine for concentrating ores of non-ferrous metals, comprising
   a vertical mixing chamber having a bottom part and a top part;
   nozzle means having an axis and installed in the bottom part of said mixing chamber for feeding thereto a pulp and air mixture under pressure;
   an impact wall disposed directly adjacent to said nozzle means, perpendicular to the axis of said nozzle means, and at a maximum distance therefrom of eight times the diameter of said nozzle means, so that the mixture being fed through said nozzle means hits said impact wall, whereby flows containing air bubbles of a diameter not exceeding 150-200 μm are formed;
   said mixture chamber having walls constituting means for directing the flows formed as a result of collision with said impact wall toward the top part of said mixing chamber and towards each other, said top part of the mixing chamber narrowing upwardly with at least some walls inclined at an angle of 40°-75° with respect to a vertical axis of said mixing chamber;
   a pulp lift chamber having walls narrowing downwardly, the narrower part of the pulp lift chamber communicating with the top part of said mixing chamber;
   a pulp deaeration chamber which is in fluid communication with the wider portion of said pulp lift chamber so that the ascending pulp overflows over the edge of said pulp lift chamber to said pulp deaeration chamber;
   means for removing a pulp froth layer formed in said deaeration chamber; and means for discharging a residual product from said pulp deaeration chamber.

7. A flotation machine according to claim 6, comprising a dispersing chamber arranged inside said mixing chamber above said nozzle means, with said impact wall forming a wall of said dispersing chamber, said dispersing chamber having outlet opening means and a capacity which is 15-50% of the flow rate per second of the mixture fed through said nozzle means, and said dispersing chamber constituting means for lowering the velocity of the mixture flow passing therethrough by 30-70%.

8. A flotation machine according to claim 7, wherein a guide wall is provided in a path of flow exiting from said dispersing chamber, said guide wall being inclined at an angle of 20°-90° with respect to the direction of the exiting flow, and being spaced at a point from emergence of the flow from said dispersing chamber through said outlet opening means where the velocity of flow hitting against the guide wall is 30-50% lower than the velocity of the flow exiting from said dispersing chamber.

9. A flotation machine according to claim 8, wherein said nozzle means comprises a first nozzle in the bottom part of said mixing chamber and an auxiliary nozzle for feeding a preliminarily prepared pulp and air mixture to said mixing chamber, said auxiliary nozzle being installed opposite to said first nozzle in the bottom part of said mixing chamber and on the other side of said impact wall, said auxiliary nozzle disposed at a distance from said impact wall to constitute means for formation of air bubbles of a diameter not exceeding 2.5 mm in said preliminarily prepared pulp and air mixture, and wherein a preliminarily prepared water and air mixture is fed through said first nozzle in the bottom part of the mixing chamber, and said guide wall being installed with respect to said dispersing chamber at a height lower than said impact wall to constitute means for deflecting the exiting flow of the water and air mixture from said dispersing chamber, and mixing said deflected water and air mixture flow with the flow of the pulp and air mixture.

10. A flotation machine according to claim 6, comprising a tapered flow splitter in the top part of said pulp lift chamber, said splitter disposed with its narrow portion pointing downwardly and its upper, wider portion protruding over the top edge of said pulp lift chamber and said splitter being located in a zone of froth layer in said deaeration chamber, to constitute means for dividing the flow of pulp from said pulp lift chamber into at least a plurality of flows.

11. A flotation machine according to claim 10, wherein said deaeration chamber comprises means for controlling the pulp level.

12. A flotation machine according to claim 6, wherein said pulp lift chamber is formed to have a conical angle of 20°-30° and a height of 3-4 times the cross-section of the narrowest part thereof.

* * * * *